United States Patent
Wendte

(10) Patent No.: US 7,617,785 B2
(45) Date of Patent: Nov. 17, 2009

(54) DIRECT DRIVE ELECTRIC SEED METERING SYSTEM

(75) Inventor: Keith W. Wendte, Willowbrook, IL (US)

(73) Assignee: CNH America LLC, Racine, WI (US)

( * ) Notice: Subject to any disclaimer, the term of this patent is extended or adjusted under 35 U.S.C. 154(b) by 141 days.

(21) Appl. No.: 11/769,400

(22) Filed: Jun. 27, 2007

(65) Prior Publication Data

US 2009/0000533 A1    Jan. 1, 2009

(51) Int. Cl.
*A01C 7/00* (2006.01)
*A01C 9/00* (2006.01)

(52) U.S. Cl. .................... 111/185; 111/921; 111/922

(58) Field of Classification Search ......... 111/170–185, 111/921, 922
See application file for complete search history.

(56) References Cited

U.S. PATENT DOCUMENTS

| 214,683 | A |  | 4/1879 | Miller |
| 220,268 | A |  | 10/1879 | Barlow |
| 439,773 | A |  | 11/1890 | Cole |
| 2,535,222 | A |  | 12/1950 | Milton |
| 2,673,536 | A |  | 3/1954 | Skinner |
| 2,926,819 | A |  | 3/1960 | Burch |
| 3,636,897 | A |  | 1/1972 | Brink |
| 4,896,616 | A |  | 1/1990 | Wintersteiger et al. |
| 5,188,097 | A | * | 2/1993 | Hansen ..................... 601/71 |
| 6,651,570 | B1 |  | 11/2003 | Thiemke |
| 6,752,095 | B1 | * | 6/2004 | Rylander et al. ............ 111/185 |
| 7,185,596 | B2 |  | 3/2007 | Thiemke et al. |
| 2004/0134399 | A1 |  | 7/2004 | Stephens et al. |
| 2006/0006190 | A1 |  | 1/2006 | Janet et al. |

FOREIGN PATENT DOCUMENTS

CA        2 451 722        2/2007

* cited by examiner

*Primary Examiner*—Christopher J. Novosad
(74) *Attorney, Agent, or Firm*—Rebecca Henkel

(57) ABSTRACT

A direct drive electric seed metering system is provided for use with a row crop planter or seed planter that intakes a volume of multiple seeds from a seed hopper, draws individual seeds from the volume of multiple seeds and discharges them into a seed furrow formed in an agricultural field. The direct drive electric seed metering system includes a meter assembly having a meter housing and a seed plate rotatably mounted concentrically in the housing for singulating the seeds. A direct drive mechanism is mounted to the meter assembly for interfacing and driving the seed plate at an angular velocity which corresponds to the travel velocity of the seed planter. A single seed planter can have multiple direct drive electric seed metering systems, and each of the multiple direct drive electric seed metering systems preferably has its own prime mover to effectuate driving the seed plate.

6 Claims, 3 Drawing Sheets

DIRECT DRIVE ELECTRIC SEED METERING SYSTEM

FIELD OF THE INVENTION

The invention relates generally to seed planters for dispensing individual seeds at a controlled rate into a seed furrow, and in particular, to a device and corresponding method for metering seeds at a desired rate.

BACKGROUND OF THE INVENTION

Modern row crop planters or seed planters include multiple row planting units attached to a toolbar and towed behind a tractor. Each of the row planting units are responsible opening a seed trench or furrow, dispensing the seeds into the furrow, then closing the furrow after the seeds are planted. The seed furrows are opened by a first pair of disks extending down from the planter at its leading end, closed by a second pair of disks extending down from the planter at its trailing end, and then tamped down by a trailing wheel which follows both disk pairs.

Typically, each row planting unit has its own seed hopper and seed metering system for dispensing the seeds at a controlled rate into the seed trench or furrow as the planter advances along the ground. The most common seed metering systems are vacuum-type meters that use vacuum force to draw air through multiple openings in a rotating seed disk, trapping individual seeds within each opening for delivery to a second location for their release to a seed placement device. The individual seeds are then delivered by the seed placement device, between the furrow opening disk and the furrow closing disks, into the open furrow at a controlled rate.

To perform the various seed metering operations, conventional row crop planters utilize a vacuum provided by, e.g., a blower driven by a hydraulic motor attached to the hydraulic system of the tractor. However, the force required to rotate the seed disk is typically provided by a ground drive or a hydraulic drive. The ground drive, hydraulic drive, or other power source rotates a main, common driveshaft extending substantially the entire width of the row crop planter. The individual seed metering systems of the individual row planting units take power from this main driveshaft. The power is transmitted from the main driveshaft to the individual row planting units by way of chain or cable drives, driving a meter driveshaft, whereby the meter driveshaft serves as a power accepting jackshaft.

Typical meter driveshafts extend axially from, and concentrically drive, the seed plate. Notwithstanding, some attempts have been previously made to improve the compactness of seed metering systems by moving the meter driveshaft from a concentric drive interface to a perimeter drive interface, driving the outer circumferential surface of the seed disk. Known perimeter drive systems still rely on a main driveshaft serving as a common power source for all the row planting units within a row crop planter. Although such previous perimeter drive units may improve compactness of seed metering systems to some extent, they fail to address numerous issues associated with operational uniformity of seed metering systems.

In modern farming practices, there is an increased reliance upon precision planting methods. Correspondingly, the integrity of modern seed metering system operations are closely related to system efficiency, consistency, accuracy, repeatability, and thus uniformity in placing seeds during use. Known seed metering systems, concentric drive and perimeter drive alike, face various performance uniformity issues related to the operation of conventional main, common driveshaft and meter driveshaft linkages. For example, the torque required to drive all of the seed metering systems by a common main driveshaft can be significant, since each seed metering system can experience high levels of friction during operation as, e.g. the vacuum force pulls the seed plate toward and into contact with the meter housing. As another example, non-uniform operation can result from non-desired rotational drive speed variations realized at the meter driveshaft as the chains and/or cables flex, relax, tighten, and slacken as the row crop planter traverses somewhat irregular field surfaces. Any of these and other operating characteristics can lead to erratic seed placement.

Additionally, typical seed planters do not have the ability to deactivate individual row planting units, independently of one another. This can lead to overseeding or overplanting, dispensing more seed than needed, during various instances in which portions of the seed planter passes over a segment of the field more than once. Such instances include those in which point rows are commonly utilized, such as while working fields having irregular shapes, or fields with trees or other obstacles therein. Other such instances include various field turn areas such as turn rows, headland rows, or end rows. Some efforts have been made to deactivate individual row planting units. However, such efforts require the use of complex, for example, pneumatic clutch assemblies with numerous parts and which can require relatively large amounts of energy to operate.

SUMMARY OF THE INVENTION

There is a need for a seed metering system that provides improved uniformity of seed placement during row crop planting. There is also a need for a seed metering system that reduces the number of moving parts and complex mechanical linkages in a seed planter. Furthermore, there is a need for seed planters which include multiple seed metering systems which can be activated and deactivated independently of each other such that individual row planting units can be engaged or disengaged independently as desired, whereby overplanting can be managed and minimized.

The present invention provides a direct drive electric seed metering system which meets the desires and needs described above, while being used, e.g., in combination with a row crop planter or seed planter. In a first embodiment of the present invention, a direct drive mechanism for use with a seed metering system is provided. The seed metering system can be of the vacuum-type and can have a metering housing that encapsulates a seed plate. The seed plate is rotatable and is adapted to transfer individual seeds from one portion of the metering housing to another where they are discharged. In vacuum-type implementations of the seed metering systems, the seed transfer by the seed plated is aided by vacuum or negative pressure, holding the seeds against the seed plate.

It is contemplated for the direct drive mechanism to be provided with a drive housing and prime mover attached to the drive housing. The drive housing is preferably attached to the metering housing. In such a configuration, the prime mover can drive an output gear that, in turn, drives the seed plate. As desired, the prime mover can be an electric motor, preferably a 12V DC electric motor. In some implementations, the output shaft of the prime mover can have a pinion gear mounted thereto, which drives the output gear, and thus, the seed plate.

In still further implementations, the direct drive mechanism interfaces with the outer circumferential surface of the seed plate and selectively rotates it. Such an interfacing relationship can be realized between the seed plate and the prime mover and/or the output gear of the direct drive mechanism. Accordingly, the outer circumferential surface of the seed plate and the outer circumferential surface of the output gear have corresponding structures which facilitate the transfer of force therebetween. As one example, the outer circumferential surfaces can have spur gear teeth, interfacing and meshing with each other. As another example, the outer circumferential surfaces can have helical gear teeth, interfacing and meshing with each other.

Other objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

DETAILED DESCRIPTION OF THE PREFERRED EMBODIMENTS

Figure 1:
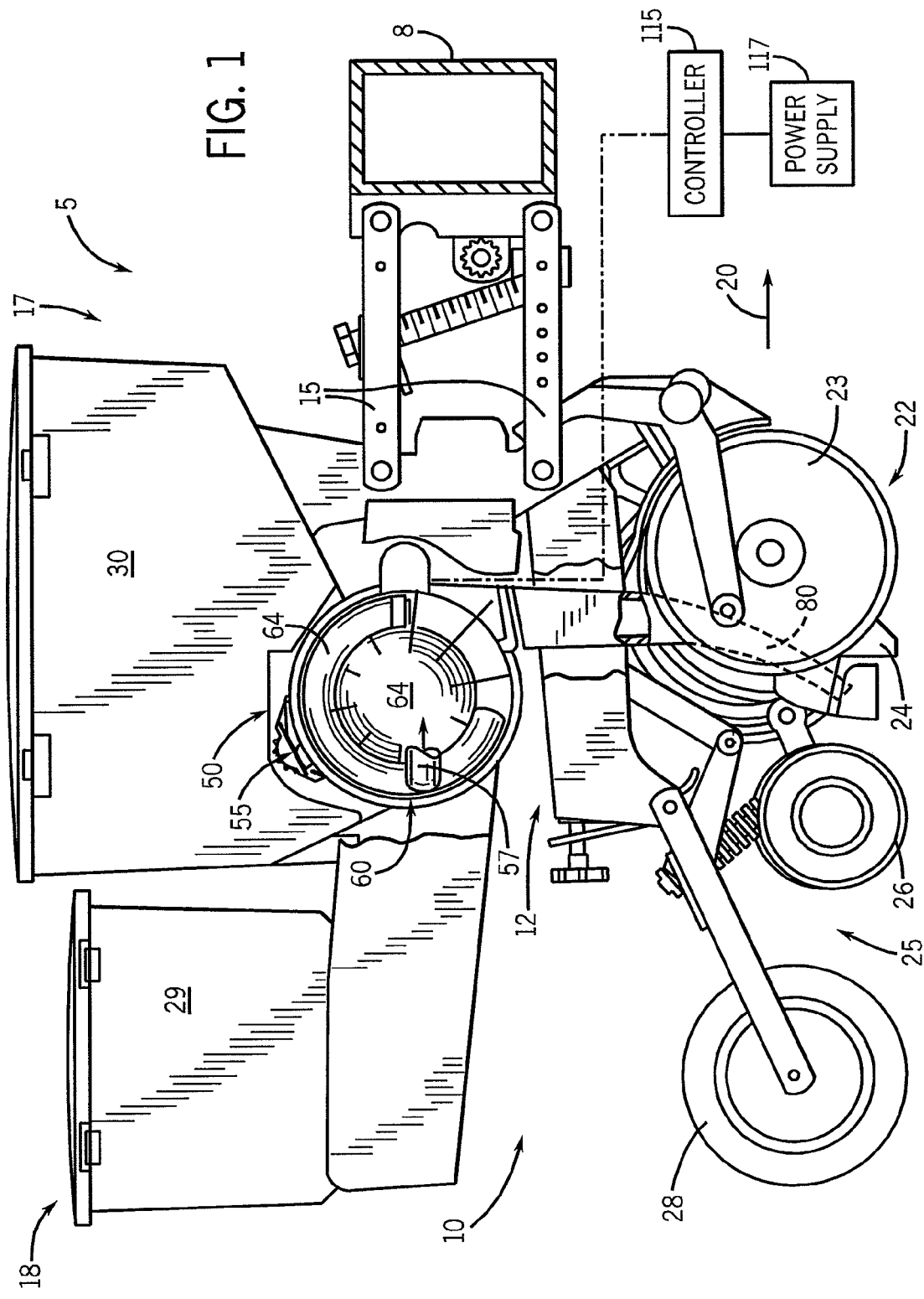
FIG. 1 illustrates a side elevational view of a portion of a seed planter incorporating a first embodiment of direct drive electric seed metering systems in accordance with the present invention.

Referring now to the drawings and specifically to FIG. 1, a portion of a multiple row crop planter implement or seed planter 5 is shown. The seed planter 5 is typically pulled by a tractor or other traction device (not shown). Seed planter 5 includes a toolbar 8 that holds multiple individual row planting units 10, each row planting unit 10 being substantially identical. Only a single row planting unit 10 is shown for simplicity sake.

Row planting unit 10 includes a frame 12 that attaches the unit 10 to toolbar 8 by way of parallel linkages 15. Row planting unit 10 has a leading end 17 which faces the direction of travel, indicated by arrow 20. A trailing end 1 8 faces the opposite direction, away from the direction of travel 20. Frame 12 supports a furrow opening mechanism 22 near the leading end 17 of row planting unit 10, for cutting open the furrow to receive the deposited seeds. As is known in the art, the furrow opening mechanism 22 includes a pair of lateral spaced furrow opener disks 23, a furrow forming point, and an opener shoe 24. Optionally, the row planting unit 10 can include a runner-type opener for providing a furrow in the ground.

A furrow closing mechanism 25 is located at the opposing end of the planting unit 10, near trailing end 18. Closing mechanism 25 includes a pair of furrow closer disks 26 and a trailing wheel 28. The closer disks 26 are mounted in front of the trailing wheel 28, such that the two define a fore and aft aligned relationship relative each other. Correspondingly, after the closer disks 26 close the furrow, the trailing wheel 28 rolls over and tamps the furrow down.

In some implementations, an optional pesticide hopper 29 sits atop the frame, at the trailing end 18. Pesticide hopper 29 contains, e.g., an herbicide or an insecticide and is provided with conventional dispensing means for applying controlled amounts of the contents in the desired locations while using seed planter 5.

Seed hopper 30 is mounted atop frame 12, as is optional herbicide or pesticide hopper 29. Seed hopper 30 holds the seed supply for planting by the row planting unit 10. The particular seed hopper 30 shown in FIG. 1 is adapted and configured to store the seed material and gravitationally deposit the seed material to the ground as the seed planter 5 moves over and across the field. This procedure is explained in greater detail elsewhere herein. In other implementations, the seed supply is held in a primary seed hopper at a remote location, distant the various row planting units 10, whereby the seeds are supplied to the row planting units 10 pneumatically, or otherwise, through a seed conduit.

Figure 2:
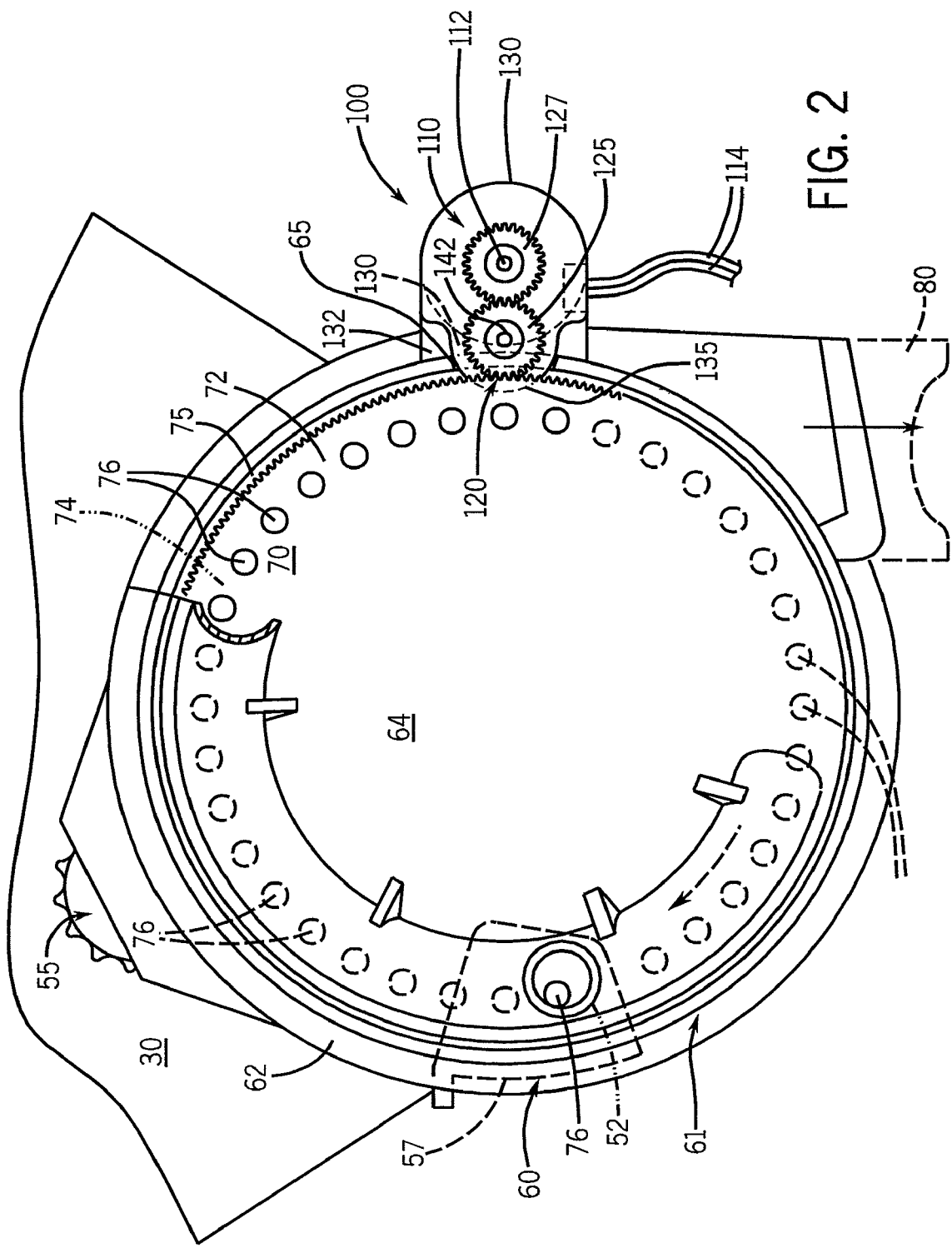
FIG. 2 illustrates a side elevational view of the direct drive electric seed metering system shown in FIG. 1, with the metering cover removed.

Regardless of the particular configuration of seed hopper 30, the seeds are directed from the seed hopper 30 to the seed metering system 50. As best seen in FIGS. 1-2, seed metering system 50 includes vacuum port 52, singulator assembly 55, seed inlet 57, meter housing 60, seed plate 70, and direct drive mechanism 100. Vaccum port 52 extends from the meter housing 60 and is connected to a vacuum source (not shown). Singulator assembly 55 is attached to the meter housing 60 and is adapted and configured to inhibit more than one seed from being discharged from the seed metering system 50 per seed discharge event. Seed inlet 57 is an elongate enclosure or conduit extending and directing seeds between the seed hopper 30 and meter housing 60. In such configuration, the seeds move, e.g., by way of gravity from the seed hopper 30 through seed inlet 57 and into a reservoir or void space within the meter housing, such as meter cavity 61.

Meter housing 60 has a backing plate 62 and a cover 64, which are connected to each other and define a meter cavity 61 therebetween. The meter cavity 61 houses the seed plate 70 therein. As seen in FIG. 2, vacuum port 52 extends outwardly from cover 64 and seed inlet 57 extends from backing plate 62. In this configuration, it is apparent that the vacuum port 52 and seed inlet 57 are positioned on opposing sides of the meter housing 60 and seed plate 70. As desired, the vacuum port 52 and seed inlet 57 are at least partially registered with each other, on opposing sides of the seed plated 70. An opening 65 passes through the meter housing 60 permitting, e.g., portions or components of the direct drive mechanism 100 to extend into the meter cavity 61 and cooperate and interface with the seed plate 70.

The seed plate 70 is a flat, disk-like member, having opposing front and back surfaces 72 and 74, respectively. Seed plate 70 has a geared outer circumferential surface 75, with, e.g., gear teeth radially extending therefrom. Seed pockets 76 are discrete openings that extend between front and back surfaces 72, 74, and thus through the entire thickness of the seed plate 70. The seed pockets 76 are spaced from each other, yet are radially spaced equidistant from an axis of rotation of the seed plate 70.

Seeds are guided, by the seed inlet 57, from seed hopper 30 to the meter cavity 61, generally into the space between the back surface 74 of seed plate 70 and the inwardly facing surface of backing plate 62. The seed plate 70 rotates in the meter cavity 61, whereby the seed pockets 76 pass across and interface the seeds which accumulate in the meter cavity 61. In vacuum-type implementations of the seed metering system 50, the vacuum or negative pressure is drawn through the vacuum port 52 and thus also through the seed pockets 76. In other words, vacuum or negative pressure is drawn from the beyond the front surface 72 which draws the seeds into the seed pockets 76, against the back surface 74 of seed plate 70. Regarding the particular vacuum-based methods and devices to apply negative pressure or vacuum to the seek pockets 76, any of the various conventional vacuum-based seed metering techniques will suffice. However, preferred structures, apparatuses, and methods are disclosed in commonly owned U.S. application Ser. No. 10/388,342, entitled SEED PLANTER APPARATUS AND METHOD, filed on Mar. 13, 2003 and issued as U.S. Pat. No. 6,776,108 on Aug. 17, 2004, which is herein incorporated by reference, in its entirety.

The vacuum holds the seeds in the seed pockets 76 where they are rotatably transported in unison with the rotation of seed plate 70. As the seeds rotate with seed plate 70, and thus as they approach the discharge portion of the seed metering system 50, the seeds encounter the singulator assembly 55. Singulator assembly 55 is a conventional seed singulator device which insures that one and only one seed is present in each seed pocket 76 as each particular seed pocket 76 approaches the discharge area of the seed metering system 50, for dispensation through seed tube 80. The seeds that are delivered into seed tube 80 are deposited into the furrow, between the furrow opening and closing mechanisms 22 and 25, respectively.

Seed tube 80 is a generally upright or vertical passage, which directs the seed to the ground or furrow for planting. Preferred versions of suitable seed tubes 80 are disclosed in commonly owned U.S. application Ser. No. 08/581,444, entitled SEED METERING APPARATUS SEED TUBE, filed on Dec. 29, 1995 and issued as U.S. Pat. No. 5,974,988 on Nov. 2, 1999, which is herein incorporated by reference, in its entirety.

Figure 3:
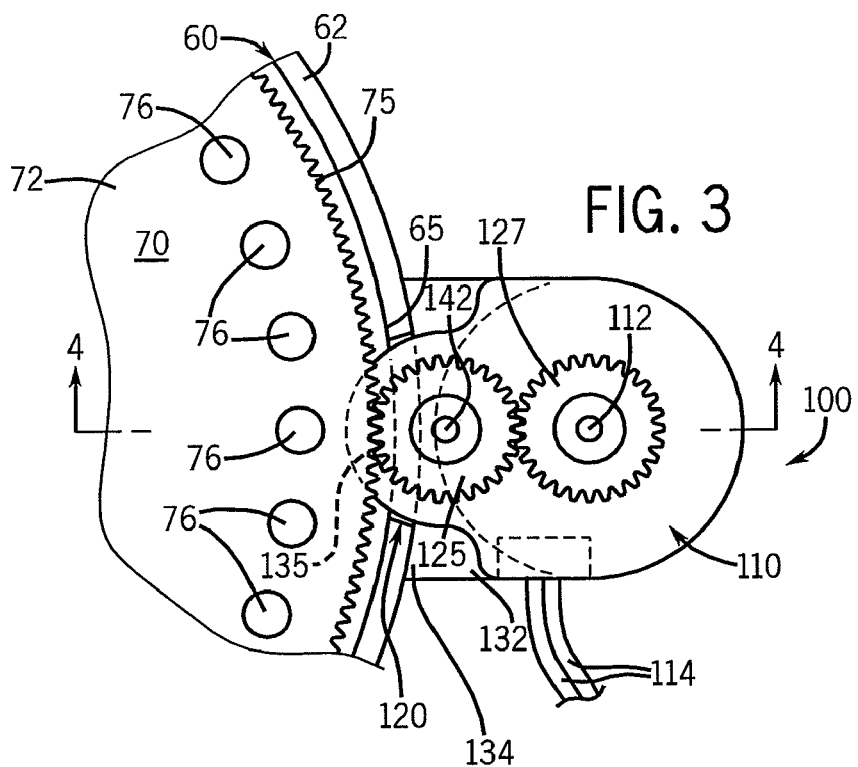
FIG. 3 illustrates an enlarged side elevation of a portion of the direct drive electric seed metering system, shown in FIG. 2.
Figure 4:
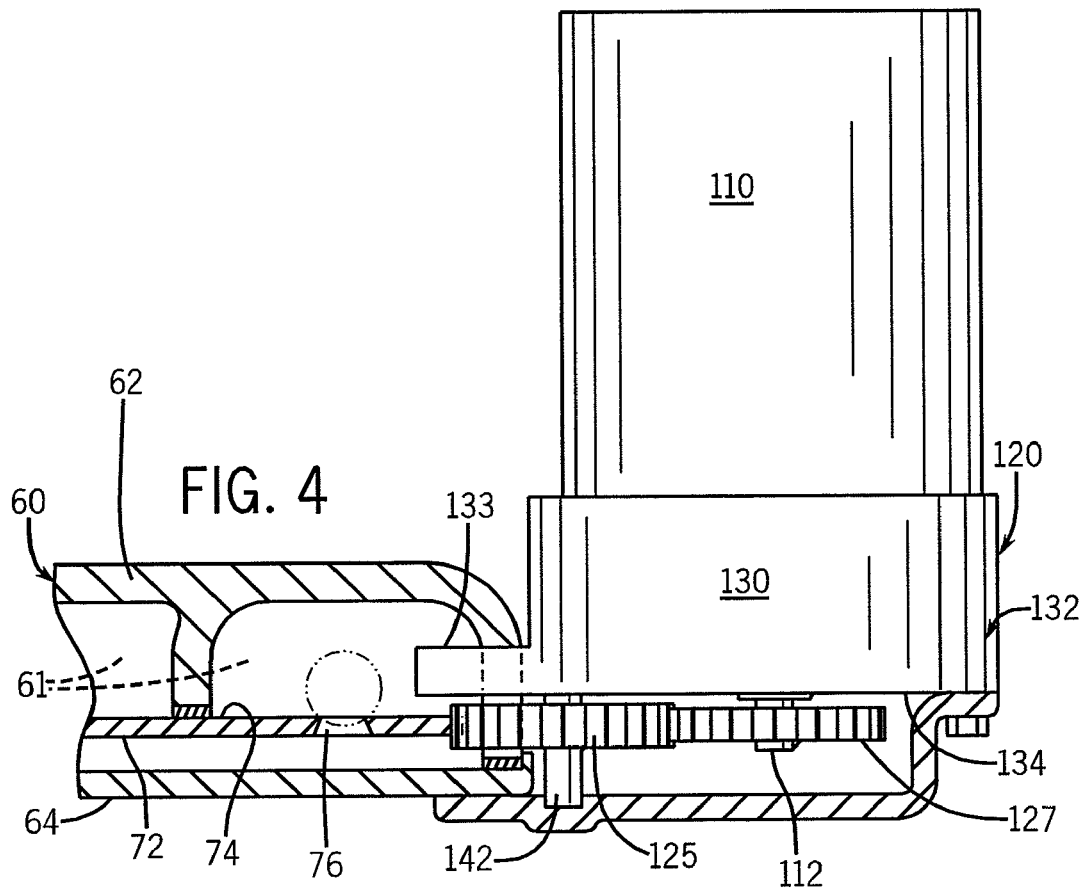
FIG. 4 illustrates a cross-sectional view of a portion of a direct drive electric seed metering system taken at line 4-4 in FIG. 3.

Referring now to FIGS. 3-4, seed plate 70, rotates by way of its driven cooperation with direct drive mechanism 100. Direct drive mechanism 100 selectively rotates or drives the seed plate 70 at a variable speed. The particular speed at which speed plate 70 is driven by the direct drive mechanism 100 is related, at least in part, to the ground speed or travel velocity of seed planter 5. The direct drive mechanism 100 includes prime mover 110, drive output assembly 120, and drive housing 130, and is directly attached to the remainder of the seed metering system 50. Prime mover 110 is preferably an electric motor with an output shaft 112, and, more preferably, a 12V DC electric motor with an output shaft 112. Conductors 114 operably connect the prime mover 110 to a controller 115 and a power supply 117 (FIG. 1) which can be electrically connected to the 12V DC electrical system of the tractor. The controller 115 is further operably connected, in a conventional manner, to any of a variety of suitable sensors for sensing, e.g., travel velocity of the row crop planter 10, and/or other operating characteristics, which will be evaluated by the controller 115 in determining the desired rate of rotation of seed plate 70 by energizing direct drive mechanism 100.

The particular configuration of drive output assembly 120 is selected based on the operating characteristics of prime mover 110 and seed plate 70. In preferred embodiments, drive output assembly 120 provides an output gear 125 which rotates at a variable speed between 0-rpm and 600-rpm. Accordingly, for implementations of prime mover 110 that suitably operated with an output shaft speed of between 0-rpm and 600-rpm, the output assembly can be the output gear 125 alone. Stated another way, in some implementations, the output gear 125 is mounted concentrically to the prime mover 110 output shaft 112 and it directly interfaces with and drives the geared outer circumferential surface 75 of seed plate 70.

In other implementations, the drive output assembly 120 includes other transmission or gear train components, for example, when the primer mover 110 optimally functions at operational speeds of about 2,000-3,000-rpm. In such implementations, the drive output assembly 120 includes output gear 125 and pinion gear 127 that is mounted to the output shaft 112 of the prime mover 110. The diameters of output and pinion gears 125 and 127, respectively, are selected to mechanically step down the 2,000-3,000-rpm shaft speed of prime mover 110 to the desired 600-rpm maximum rotational speed of output gear 125, ensuring the desired rotational operation speeds of seed plate 70. Besides realizing different rotational rates of seed plate 70 and output shaft 112, multiple gears such as output and pinion gears 125 and 127, respectively, can be implemented based on other gear-train kinetic reasons. For example, both output and pinion gears 125 and 127, respectively, can be included in the direct drive output assembly 100 when it is desired to have the seed plate 70 and the prime mover output shaft 112 rotate in the same direction.

Regardless of whether output gear 125 or pinion gear 127 is mounted to output shaft 112, the output gear 125 and the geared outer circumferential surface 75 of seed plate 70 are configured in a cooperating, force transmitting, preferably gear teeth meshing manner. Accordingly, outer circumferential surface 75 and the outer circumferential surface of output gear 125 can have cooperating, e.g., spur gear teeth, helical gear teeth, or suitable force transmitting configurations.

Drive housing 130 includes mounting plate 132 that is connected to, and optionally integral with, meter housing 60. Drive housing 130 has an open end 135 having a perimeter shape and configurations that correspond to the perimeter shape and configuration of the meter housing opening 65. In the complete assemblage, the void space within drive housing 130 and the void space within meter housing 60 commingle within the intersection of drive housing open end 135 and meter housing opening 65. In this configuration, the output gear 125 can extend into meter housing 60 whereby the gear teeth of the seed plate 70, geared outer circumferential surface 75, and those of the output gear 125 can mesh and cooperatively interface.

Prime mover 110 and output gear 125 are attached to mounting plate 132. In some implementations, prime mover 110 extends outwardly from a first side 133 of the mounting plate 132 and its output shaft 112 extends through a bore 140, outwardly from the second side 134 of the mounting plate 132. Pinion gear 127 is rotatably mounted to a pin 142 that is attached to and extends from the second side 134 of the mounting plate 132. Accordingly, prime mover 110 extends from an opposing side of mounting plate 132, as compared to output shaft 112 and pinion gear 127. Output gear 125 is mounted on the same side of mounting plate 132 as output shaft 112 and pinion gear 127, and meshes with both pinion gear 127 and seed plate 70. In other words, output gear 125 provides the means to transfer the rotational force of direct drive mechanism 100 to seed plate 70.

It is apparent that direct drive mechanism 100 eliminates, mitigates, or otherwise reduces the need for a typical main driveshaft, common to all row planting units 10 of the seed planter 5. Direct drive mechanism 100 further eliminates, mitigates, or otherwise reduces the need for any, e.g., meter driveshaft or jackshaft to drive the seed plate 70. This is because each row planting unit 10 has its own direct drive mechanism 100 attached directly thereto, and each direct drive mechanism 100 has its own prime mover 110. In this configuration, there is no need for a common source of mechanical energy to power the drive assemblies 100 through, e.g., chains, cables, or other mechanical linkages. Rather, the number of drive assemblies 100 and the number of prime movers 110 corresponds to, preferably are equivalent to, the number of row planting units 10 utilized by the seed planter 5.

In light of the above, during use, the desired seed type is received from the seed hopper 30, through the inlet 57, into the seed metering system 50. Simultaneously, furrow opening mechanism 22 opens a trough or furrow to receive seeds. Drive mechanism 100 rotates the seed plate 70 by energizing the prime mover 110, rotating its output shaft 112. The output shaft 112 rotates the pinion gear 127, which correspondingly rotates the output gear 125. The teeth of output gear 125 mesh with and drive the corresponding teeth on the geared outer circumferential surface 75 of the seed plate 70.

Vacuum is applied from the front surface 72 of the seed plate 70, drawn through the seed pockets 76, thereby drawing seeds from the meter cavity 61 into the seed pockets 76. As desired, in some configurations, a positive pressure airflow can be provided toward the back surface 74 to enhance the transfer of seeds from the meter cavity 61 to the seed pockets 76. The seed plate continues to rotate which draws the seeds in the seed pockets 76 radially away from the mass of accumulated sees in the meter cavity 61. All but one seed per seed pocket 76 are removed by the singulator assembly 55, and each such single seed is ultimately discharged from the system 50 through seed tube 80 into the furrow. As the seed planter 5 advances further, the furrow closing mechanism 25 closes the furrow with the seeds therein and the trailing wheel 28 tamps down the closed furrow.

All the while, the controller 115 (FIG. 1) monitors the ground speed or travel speed of the seed planter 5, the rotational velocity of the seed plate 70 or the seed depositing rate from seed metering system 50, and, as required, adjusts or regulates the operating characteristics of the seed metering system 50 to suitably correspond to the ground speed. The desired instantaneous seed depositing rate is a function of the travel velocity of the seed planter 5 at that instant, whereby such desired depositing rate can be predicted and sought by the controller. Accordingly, the seed metering system 50 is selectively driven by drive assembly 100, preferably at a variable rate and, more preferably, at an infinitely variable rate, based at least in part on the ground speed or travel velocity of seed planter 5.

Furthermore, preferred implementations include a single controller 115 which controls all of the drive assemblies 100, and thus, the operating characteristics of all of the seed metering systems 50. Doing so can ensure that each drive assembly 100 receives the same control signals, whereby the resultant output responses of the assemblies 100 should be substantially analogous, when that is desired. This can enhance uniformity of seed placement between the individual rows and other operating characteristics.

However, controller 115 can also control the individual drive assemblies 100 independently of each other, optionally each row planting unit has its own controller 115. In such configuration, the row planting units 10 can be activated and deactivated independently of each other, whereby overplanting can be managed and minimized. Accordingly, when using row crop planting techniques such as, e.g., planting point rows, turn rows, headland rows, or end rows, or in other situations which could lead to double planting or other overplanting conditions, the operator can de-energize and thus disengage any one or more of the individual row planting units as desired. This enables the user to comprehensively manage the application of seed, on a per row planting unit and thus per row basis. Moreover, since each row has its own controller, the user can apply corn at different population rates on each individual row, as desired. This can be particularly beneficial to growers that grow seed corn for the industry and are planting different varieties, or "male only" seeds, or otherwise desire different population rates in the individual row planting units 10 on the planter 5.

While the invention has been shown and described with respect to particular embodiments, it is understood that alternatives and modifications are possible and are contemplated as being within the scope of the present invention. A wide variety of ground-engaging implements (e.g., conventional seeders, seed planters, and row crop planters) can employ the direct drive electric seed metering system 50 of the present invention. In addition, it should be understood that the number of direct drive electric seed metering systems 50 employed on the row crop planter or seed planter 5 is not limiting on the invention.

Many changes and modifications could be made to the invention without departing from the spirit thereof. The scope of these changes will become apparent from the appended claims.

I claim:

1. A direct drive mechanism for use with a seed metering system comprising:
    a meter housing having a back plate and a cover connected to each other and define a meter cavity therebetween;
    said meter cavity includes a seed plate therein;
    a meter housing opening passes through said meter housing;
    a drive housing having an open end attached to the metering housing between a one o'clock to a six o'clock position;
    said meter housing opening and said open end of said drive housing connect together;
    a prime mover attached to the drive housing;
    said prime mover having a drive output assembly including a output gear and a pinion gear mounted to an output shaft;
    said pinion gear driven by said prime mover; and
    said output gear driven by the pinion and interfacing the seed plate, wherein the direct drive mechanism is directly connected to and selectively directly drives the seed metering system; wherein said cover encloses said meter housing opening and said prime mover keeping enclosed area free of debris.

2. The direct drive mechanism as in claim 1, wherein the prime mover is an electric motor.

3. The direct drive mechanism as in claim 1, wherein the prime mover is a 12V DC electric motor.

4. The direct drive mechanism as in claim 1, wherein the output gear extends into the metering housing.

5. The direct drive mechanism as in claim 1, wherein a pinion gear is mounted between and cooperates with the prime mover and the output gear.

6. The direct drive mechanism as in claim 1, wherein the output gear drives the seed plate by way of a gear meshing interface.

* * * * *